United States Patent
Visser et al.

(10) Patent No.: US 7,466,167 B2
(45) Date of Patent: Dec. 16, 2008

(54) DRIVER CIRCUIT FOR REDUCING THE EFFECTS OF DISTURBANCES ON THE DUTY CYCLE OF A DIGITAL SIGNAL ON A BUS CONDUCTOR

(75) Inventors: Ruurd A. Visser, Beuningen (NL); Marcellinus W. M. Oosterhuis, Holten (NL); Gerrit J. Bollen, Dieren (NL)

(73) Assignee: NXP B.V., Eindhoven (NL)

( * ) Notice: Subject to any disclaimer, the term of this patent is extended or adjusted under 35 U.S.C. 154(b) by 53 days.

(21) Appl. No.: 11/577,714

(22) PCT Filed: Oct. 17, 2005

(86) PCT No.: PCT/IB2005/053398

§ 371 (c)(1),
(2), (4) Date: Apr. 20, 2007

(87) PCT Pub. No.: WO2006/043229

PCT Pub. Date: Apr. 27, 2006

(65) Prior Publication Data
US 2008/0084945 A1    Apr. 10, 2008

(30) Foreign Application Priority Data
Oct. 20, 2004    (EP)    ................... 04105183

(51) Int. Cl.
*H03B 1/00* (2006.01)
(52) U.S. Cl. ................................. 327/108
(58) Field of Classification Search ............ None
See application file for complete search history.

(56) References Cited

U.S. PATENT DOCUMENTS 6,130,541 A * 10/2000 Ozguc ................. 324/678
6,163,178 A * 12/2000 Stark et al. ............ 327/108

FOREIGN PATENT DOCUMENTS

WO    2004/004259 A1    1/2004

* cited by examiner

*Primary Examiner*—Cassandra Cox

(57) ABSTRACT

An electronic circuit contains a driver circuit (12) with an output coupled to a digital communication conductor (14), for driving changes of a potential at the digital communication conductor (14) to and from a digital signal level. The driver circuit (12) comprises a control circuit (120), to generate selection signals that select increasingly stronger drive strengths and increasingly weaker drive strengths during changes to and from the digital level respectively. A controllable current supply circuit (122, 124), has a current control input coupled to the control circuit (120) for receiving the selection signals and a current supply output coupled to the digital communtication conductor (14). A detector circuit (126) has an input coupled to the digital communication conductor (14) and an output coupled to the control circuit (120), and arranged to detect whether a potential at the digital communication conductor (12) has reached a required range. The control circuit (120) stores information about the drive strength that was selected when the detector circuit (126) indicated that the range was reached during the change to the digital level, and during the change it restores the drive strength to the last stored drive strength as a first step during the change away from the digital level.

8 Claims, 2 Drawing Sheets

DRIVER CIRCUIT FOR REDUCING THE EFFECTS OF DISTURBANCES ON THE DUTY CYCLE OF A DIGITAL SIGNAL ON A BUS CONDUCTOR

PCT patent application No. WO 2004/004259 describes a driver circuit for a CAN bus or a LIN bus. The CAN bus and the LIN bus are examples of electronic busses that are used to communicate information between different parts of a circuit. A bus comprises one or more communication conductors that connect the different parts of the circuit.

It is desirable to be able to control the slew rate of the potential of a bus conductor. The slew rate is the rate at which a potential on the bus conductor changes when it changes from one logic level to another. To control the slew rate WO 2004/004259 couples a plurality of driver elements in parallel to the bus conductor, for driving the potential of the bus conductor to a digital level. During the switch from one logic level to another progressively more of these driver elements are activated. A feedback loop is uted to compare the signal at the bus conductor with a reference signals that has a desired slew rate and the comparison result is used to control the time of activation of the driver elements so as to match the signal at the bus conductor to the desired slew rate.

Bus conductors often have to operate under hostile conditions. External disturbances and unpredictable impedance effects can give rise to unpredictable signal leve variations. Bus interface circuits should be designed to prevent damage due to large signal variation. Furthermore, it should be prevented as much as possible that signal variations lead to errors in the digital data that is obtained from the bus conductors.

One of the aspects of the digital signal on a bus conductor is its duty cycle, that is, the fraction of time that the signal assumes a certain logic level. In many bus circuits, assumptions are made about the duty cycle to detect digital information. However, the duty cycle can be disturbed by signal variations at the transition from one logic level to another. In particular when use is made of a number of driver elements that are progressively activated, the drive strength will not be large initially. As a result disturbances at that time can easily affect the duty cycle.

Among others, it is an object of the invention to reduce the effects pf disturbances on the duty cycle of a digital signal on a digital communication conductor like a bus conductor.

An electronic circuit and a method of controlling a potential of a communication conductor according to the invention are set forth in the independent claims. The drive strength, with which the communication conductor is driven to a digital level, is increased preferably in a predetermined steps when the potential is changed to the digital level. When the potential is changed away from the digital level the drive strength is progressively decreased, also preferably in predetermined steps. According to the invention a detector is used to detect when the potential enters a predetermined range around the digital level and information about the drive strength at that time is stored. When the potential is changed away from the digital level the drive strength is initially returned substantially in one step to the level represented by this information. Thus, if the potential reaches the range sooner than normal due to a disturbance (i.e. with a weaker drive strength than normal), the initial step when the potential is changed away from the digital level provides for a lower drive strength. Thus, the effect of the disturbance on the duty cycle (the time interval between the time points where the potential reaches the interval and leaves the interval) is reduced.

In an embodiment a permanently connected resistor is used to pull the potential away from the digital level, the progressively increasing and decreasing driving strength driving the potential against the effect of the resistor. As a result of the return, substantially in one step, to the level represented by the stored information, the counteraction of the effect of the resistor is reduced more at the end of the duty cycle if the duty cycle starts sooner. In another embodiment, one or more actively switched driving element may be used instead of the resistor, or in addition to the resistor, to drive the potential away from the digital level.

In an embodiment a plurality of switchable driving elements, which each produce a predetermined drive strength when active, are coupled to the communication conductor in parallel. In this embodiment the drive strength is progressively increased and decreased by activating more or fewer of the driving elements. In this embodiment the stored information preferably represents which of the driving elements where active when the potential reached the range and on return from the digital level a drive strength equal to those driving elements is kept active initially.

Preferably, the drive strength is stepped up to a predetermined level once the potential has reached the predetermined range. In this way it is counteracted that the potential can leave the range at the end of the disturbance that made the potential reach the range too soon, or due to another disturbance. In this embodiment the drive strength is preferably switched back from this predetermined strength to the level represented by the stored information once a signal has been received that commands that the potential must be changed away from the predetermined level.

In a further embodiment a counter circuit is used, with a count output htat controls a number of driving elements that is activated in parallel to drive the potential on the communication conductor. The counter circuit counts up during switching to the digital level and down during switching away from the digital level. In this embodiment counting is disabled in response to detection that the range has been reached and the counting direction is reversed once the signal has been received that commands that the potential must be changed away from the predetermined level.

These and other objects and advantageous aspects of the invention will be illustrated by means of non-limitative examples that are described using the following Figures.

FIG. 1 shows an electronic circuit

FIG. 2 shows a signal on a digital communication conductor

FIG. 3 shows a control circuit

FIG. 1 shows an electronic circuit, comprising a digital source 10, a driver circuit 12, a bus conductor 14, a pull resistor 16 and a digital reveicer circuit 18. Driver circuit 12 comprises a control circuit 120, a clock circuit 121, a plurality of current sources circuits 122, a plurality of switches 124, and a level detector 126. Each of the currect source circuits 122 forms a respective driver branch in series with a respective one of the switches 124. Although only three such branches are shown for the sake of clarity, it should be understood that a larger number may be present. A plurality of driver branches is coupled in parallel between bus conductor 14 and a first power supply connection V1. Digital source circuit 10 has an output coupled to control circuit 120. Clock circuit 121 is coupled to a clock input of control circuit 120. Level detector 126 has an input coupled to bus conductor 14 and an output coupled to a control input of control circuit 120. Control circuit 120 has control outputs coupled to control inputs of switches 124. Bus conductor 14 is oucpled to a second power supply connection V2 via pull resistor 16. Digital receiver circuit 18 has an input coupled to bus conductor 14.

Figure 2:
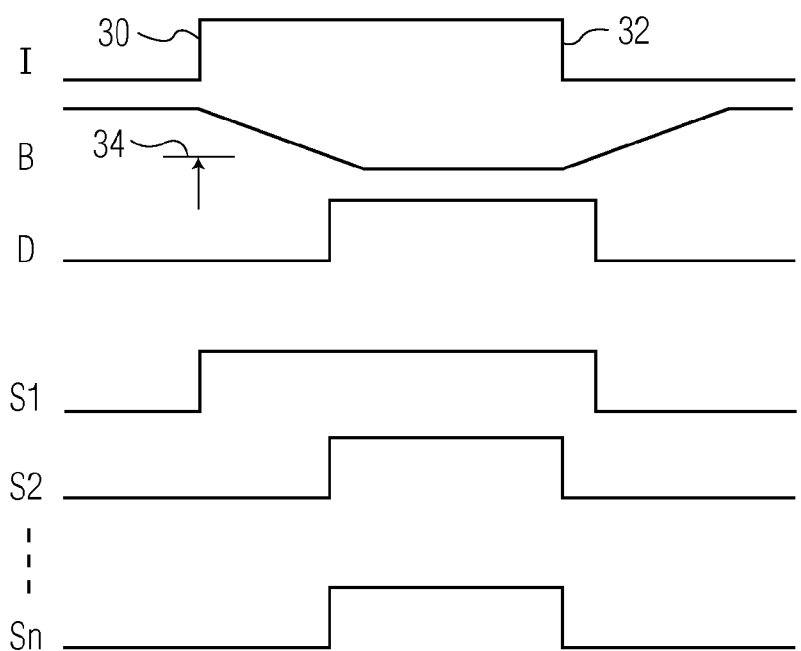

FIG. 2 shows signals that illustrate operation of the circuit. In operation digital source circuit 10 supplies a binary signal I to driver circuit 12. In response to a first transition 30 in the binary signal driver circuit 12 starts pulling a portential B of bus conductor 14 away from a potential of second power supply connection V2, toward a potential of first power supply connection V1. The top of a range of potentials wherein level detector 126 detects that the potential B has reached a required range is indicated by a tip level 34; this range may extend indefinitely to lower levels. In response to a second transition 32 (opposite to the first transition) driver circuit 12 starts releasing the potential B of bus conductor 14, permitting the potential B of bus conductor 14 to return towards the potential of the second power supply connection V2.

In response to the first transition control circuit 120 controls switches 124 to switch on one after the other, so that a progressively increasing number of current source circuits 122 supplies current to bus conductor 14. Level detector 126 detects whether the potential B of bus conductor 14 has reached a potential range that corresponds to the required logic level that corresponds to the output signal I of digital source circuit 10 (e.g. a range from one volt above the potential of power supply conductor V1). Level dector 126 applies a detection signal D to control circuit 120, to signal when level detector 126 has detected that the potential B of bus conductor 14 has entered this range. In response control circuit 120 switches on all switches 124, so that the potential of bus conductor 14 is subsequently pulled towards the potential of first power supply connection V1 with maximum strength.

By way of example, the Figure shows that control circuit 120 has caused the control signal S1 of one of switches 124 to switch on a switch 124 before level detector 126 detected that the potential B of bus conductor 14 has entered the required range. Subsequently, control circuit 120 causes the control signals S2-Sn of all other switches 124 to switch these switches on as well. It should be understood that it is merely an example that only one switch has been switched on before level detector 126 detects that the potential B of bus conductor 14 entered the required range. Dependent on busload and disturbing signals on bus conductor 14, control circuit 120 may have switched on any number of switches 124 at the time of detection that the potential B of bus conductor 14 entered the required range.

One advantageous aspect of the invention is that in this way driver circuit 12 switches on all switches 124 once the potential B of bus conductor 14 has entered the required range, no matter how this range has been reached. Driver circuit 12 switches on all switches 124 both when the range is reached due to current from current sources 122 and when the range is reached due to external disturbances. In this way driver reduces the risk that the potential B of bus conductor 14 returns afterwards if the rangs is reached due to external disturbances.

Control circuit 120 "remembers" the number of switches 123 that was switched on just before level detector 126 signaled that the potential of bus conductor 14 has entered the required range. However, during the time interval that digital source circuit 10 signals that potential of bus conductor 14 has to remain in this range control circuit 120 and after level detector 126 has detected that the potential B of bus conductor 14 has entered the required range control circuit 120 keeps all switches 124 switched-on. That is, typically more switches 124 are kept on than conrol circuit remembers to have been on just before the potential of bus conductor 14 entered the required range.

When digital source circuit 10 signals an opposite transition 32, control circuit 120 controls a number of switches 124 to switch off substantially simultaneously, so that all but the remembered number of switches initialy remains switched on after transition 32. The other switches are switched off substantially simultaneously in response to the second transition 32. Subsequently, control circuit 120 switches off the switches 124 one by one until all switches 124 are switches off. That is, the same number of switched is initially kept switched on as just before level detector 126 detected that the potential B of bus conductor 14 entered the required range. In the Figure, control circuit 120 initially switches off all but one of switches 124 after the opposite transition 32 and subsequently control circuit 120 switches off the remaining switch 124.

In this way the duty cycle (the duration between transitions 30 and 32) is preserved. If disturbance of the potential B of bus conductor 14 cause the potential B to reach the required range sooner, then the immediate switch-off of a number of switches simultaneously, symmetrically with their previous switch-on, causes the potential B to return more quickly.

Figure 3:
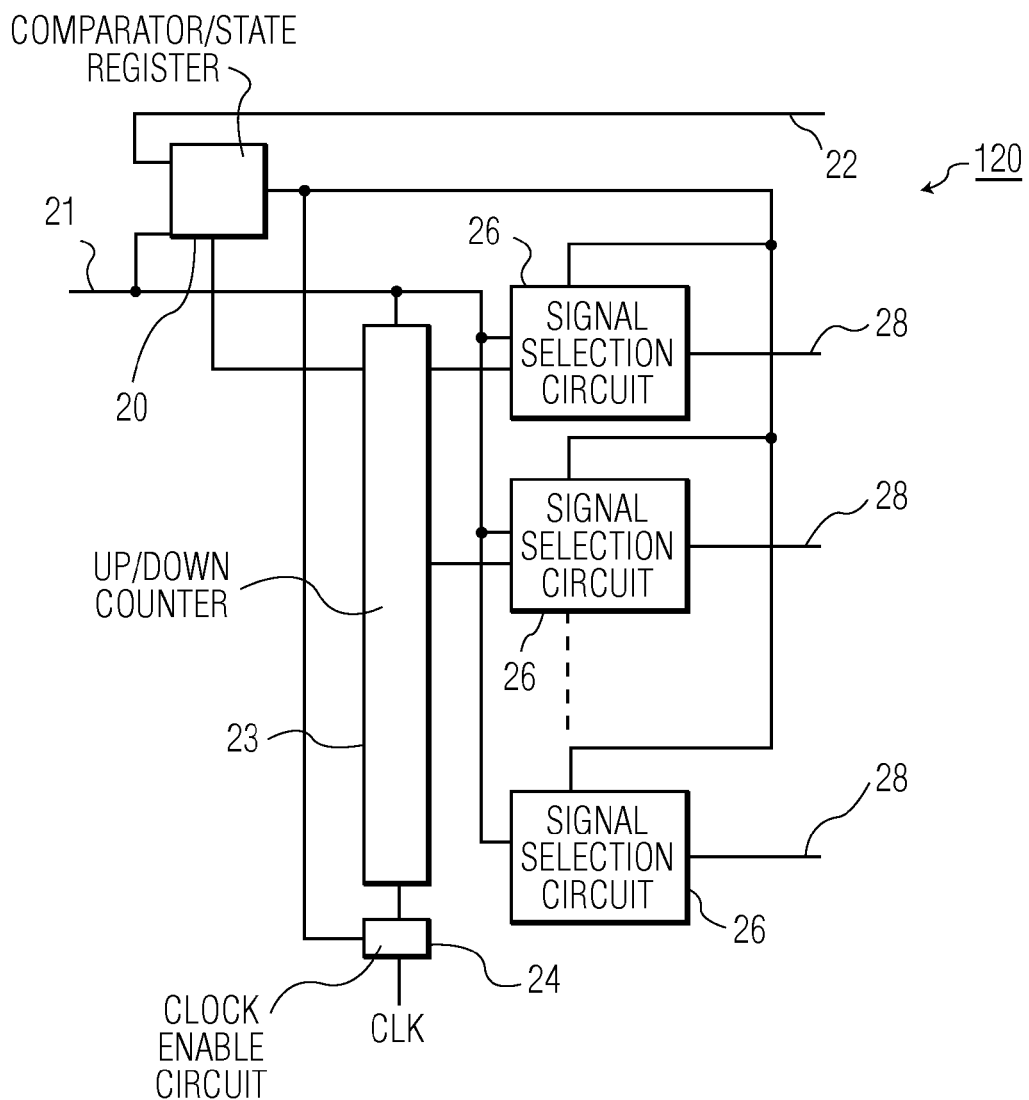

FIG. 3 shows an embodiment of a control circuit 120. The control circuit contains an up/down Johnson counter 23, a comparator/state register 20, a clock enable circuit 24 and signal selection circuits 26. Comparator/state register 20 has inputs 21, 22 coupled to the output of digital source circuit 10 (not shown) and level detector 126 (not shown) respectively. Comparator/state register 20 has an output coupled to an enable input of clock enable circuit 24 and control inputs of signal selection circuits 26. Up/down counter 23 has an up/down control input coupled to the output 21 of digital source circuit 10 (not shown). Up/down counter 23 has a clock input coupled to clock circuit 121 (not shown) via clock enable circuit 24. Up/down counter 23 has outputs coupled to first inputs of respective ones of signal selection circuits 26. Signal selection circuits 26 have second inputs coupled to the output 21 of digital source circuit 10 (not shown).

In operation, in a steady state when the output signal of digital source circuit 10 corresponds to the level detected by level detector 126, comparator/state register 20 forces signal selection circuits 26 to output a signal corresponding to the signal from digital source circuit 10. As a result either none of current source circuit 122 supply current in the steady state when the output signal of digital source circuit 10 is at a first level or all of current source circuit 122 supply current in the steady state when the output signal of digital source circuit 10 is at a second level.

Initially when digital source circuit 10 outputs a signal at a first level and this signal corresponds to the output signal of level detector 126 comparator/state register 20 forces signal selection circuits 26 to output a signal corresponding to the signal from digital source circuit 10. As a result none of current source circuit 122 supplies current to bus conductor 14.

When digital source circuit 10 outputs a transition from the first level to the second level, comparator/state register 20 detects the resulting lack of correspondence between the output signal of digital source circuit 10 and level detector 126, and switches to a state wherein clock enable circuit 24 passes clock pulses to up/down counter 23. The signal from digital source circuit 10 causes up/down counter 23 to count up in this state. Up/down counter 23 functions as a Johnson counter, that is, a counter that raises the signal at an increasing number of outputs as more clock pulses are received. At each clock pulse up/down counter 23 outputs control signals to switch on a greater number of switches 124. Signal selection circuits 26 pass these signals to switches 124.

When level detectors 126 detects a resulting transition of the signal at bus conductor 14, level detector signals this to comparator/state register 20. In response comparator/state register 20 resets to the steady state wherein comparator/state register 20 disables the supply of clock pulses to up/down counter 23. Furthermore, in this state comparator/state register 20 forces signal selection circuits 26 to output a signal corresponding to the signal from digital source circuit 10. As a result all of current source circuit 122 supply current to bus conductor 14.

When digital source circuit 10 outputs a transition back from the second level to the first level, comparator/state register 20 detects the resulting lack of correspondence between the output signal of digital source circuit 10 and level detecto 126, and switches to a state wherein clock enable circuit 24 passes clock pulses to up/down counter 23 and wherein signal selection circuits 26 passes output signals from up/down counter 23. The signal from digital source circuit 10 causes up/down counter 23 to count down in this state. Up/down counter starts from the count where it left off after the transition from the first level to the second level. At each clock pulse up/down counter 23 outputs control signals to switch on a smaller number of switches 124. Signal selection circuits 26 pas these signals to switches 124.

When the output signal of digital source circuit 10 is at the second signal level comparator/state register 20 switches back to the steady state when up/down counter 23 signals that all switches have been switched off. Back in the steady state comparator/state register 20 forces signal selection circuits 26 to output a signal corresponding to the signal from digital source circuit 10. As a result none of current source circuit 122 supply current to buss conductor 14.

It should be appreciated that the invention is not limited to the embodiments shown in the Figure. It will be appreciated that many other circuit implementation exist that are able to produce the same kind of performance. It will also be appreciated that many variations are possible in the circuits that have been shown.

Preferably all current source circuits 122 are designed to deliver substantially the same current, so that a substantially linear increase of driving strength can be realized as a function of time. But without deviating from the invention current source circuites 122 may be used that produce mutually different driving strength. Current source circuits 122 are preferably realized using high impedance current sources (realized e.g. by connecting the drains of respective current source transitors to bus conductor 14). However, in an alternative embodiment current source circuits 122 may have lower impedance outputs, using for example resistances as current source circuits 122. Switches 124 have been shown in series with current sources 122. These switches can be realized by means of switch transistors that have their main current channels in series with current source circuits 122, the gate electrodes of the switch transistors being controlled by control circuit 120. However, it will be understood that an equivalent circuit function can be realized for example by using switches that short circuit the gate source connection of a current source transistor that performs the current source function and whose drain is connected to bus conductor 14.

Instead of a Johnson up/down counter 23 andother type of counter may be used, for example a normal counter followed by a decoder circuit that decodes a counter value output of the counter to control signals for switches 124. In fact the state of the counter need not remain stored in the counter. Instead the count that was reached may be stored elsewhere, for example in a computer memory, and restored when the potential of bus conductor 14 must be released. A separate register may be used for the count and the result may be added to a count value of the counter.

Instead of switching on progressively more switches to increase the current, some switches may be switched off when others are switched on as long as the current is increased, for example when a current source that is switched on in this way is stronger that a current source that is switched off.

Figure 1:
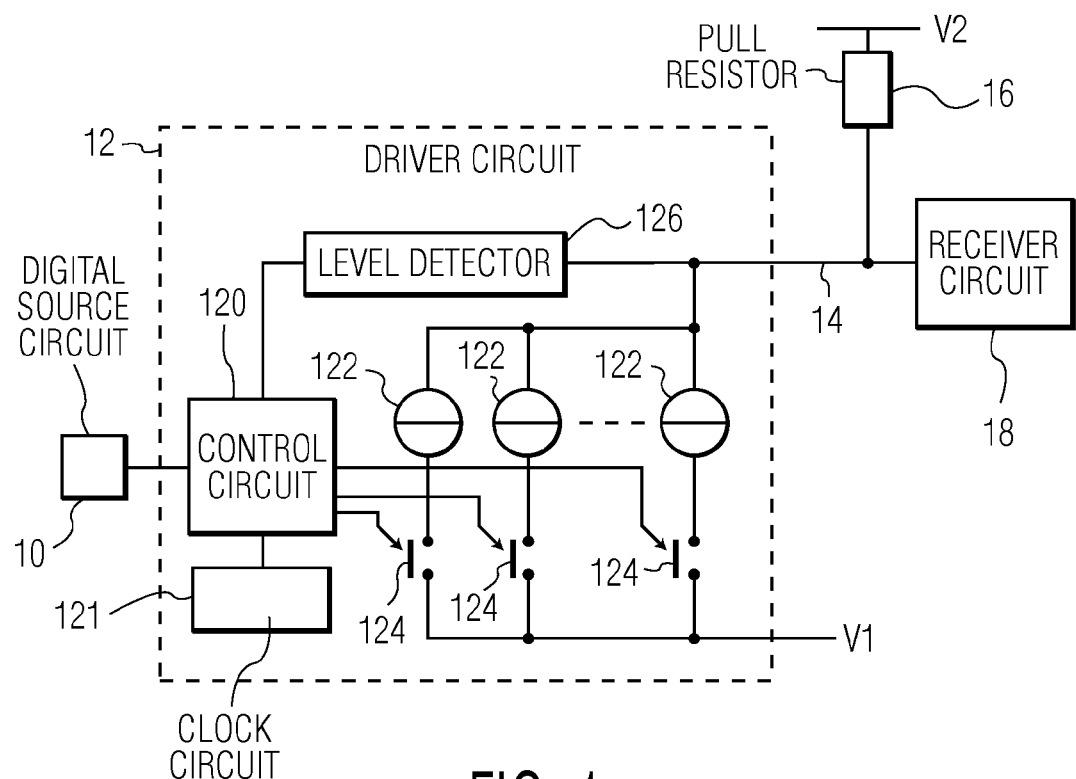

Furthermore, although a single asymmetrically driven bus conductor 14 has been shown, it will be understood that in practice more bus conductors 14 may be used in parallel, some or all of which may be driven in a similar way. Also the potential of bus conductor 14 may be driven in both directions, optionally both with a driver circuit that is similar to the driver circuit of FIG. 1.

In a further embodiment not all of switches 124 are switched on when level detector 126 indicates that the potential B of bus conductor 14 has teached the required range. For example a predetermined fraction of switches may be switched on, an excess of switches above that fraction being switched on only if the rate of change of the potential B of bus conductor 14 if too slow. In another embodiment a predetermined fraction of the switches may be switched off later while digital source circuit 10 still indicates that potential B of bus conductor 14 should be pulled away from the potential of second power supply connection V2.

In yet another embodiment only the number of switches 124 remains switched on that were switched on when level detector 126 indicates that the potential B of bus conductor 14 has reached the required range. This has the disadvantage that too few switches may remain switched on if the range was reached due to external disturbances. But in an embodiment, control circuit 120 may arranged to determine whether the number of switches 124 that is switched on is within a predetermined normal range of numbers (which indicative of the fact that the required potential range was not reached due to disturbances) and if the number is in the normal range control circuit leaves a number of switches 124 on that was switched on when level detector 126 indicates that the potential B of bus conductor 14 reached the required potential range. Alternatively control circuit 120 may switch on this number of switches 124 plus a predetermined number of additional one of switches 124.

In yet another embodiment a single driver transistor may be used instead of the plurality of current sources 122. In this case, the control signal of this single driver transistor is changed as a function of time when the potential B of bus conductor 14 is pulled away from the potential of second power supply connection V2. A representation of the control signal that was reached is stored in this case. When the potential B of bus conductor 14 is allowed to return to the potential of second power supply connection V2, this stored value is used to set the initial control signal value. The control this single driver transistor being stepped up or down in the same way as the number of activated switches 124 is stepped up or down. However, the use of a single driver transistor has the disadvantage that its variable control signal is more susceptible to disturbance than the control signals of switches 124 that only have to be switched on and off and need not each be changed in more steps.

The invention claimed is:

1. An electronic circuit comprising a digital communication conductor and a driver circuit with an output coupled to the digital communication conductor, for driving changes of a potential at the digital communication conductor to and from a digital signal level, the driver circuit comprising:

a control circuit, arranged to generate selection signals that
        select increasingly stronger drive strengths and increasingly weaker drive strengths during changes to and from the digital level respectively;

a controllable current supply circuit, with a current control input coupled to the control circuit for receiving the selection signals and a current supply output coupled to the digital communication conductor;

a detector circuit with an input coupled to the digital communication conductor and an output coupled to the control circuit, and arranged to detect whether a potential at the digital communication conductor had reached a required range; wherein the control circuit is arranged to store information about the drive strength that was selected when the detector circuit indicated that the range was reached during the change to the digital level, and to select the stored drive strength as a first step during the change away from the digital level.

2. An electronic circuit according to claim 1, wherein the control circuit is arranged to increase the selected drive strength to a predetermined value upon detection that the range was reached, and to return the selected drive strength from the predetermined value to the stored drive strength as the first step of the change away from the digital level.

3. An electronic circuit according to claim 2, wherein the control circuit comprises a counter circuit, with a count output coupled to control how many of the driving elements are activated in parallel, the counter circuit being arranged to count up during switching to the digital level and down during switching away from the digital level, the control circuit disabling counting in response to detection that the range has been reached.

4. An electronic circuit according to claim 3, wherein the control circuit comprises an overrule circuit arranged to activate a predetermined number of the driving elements, irrespective of a count reached by the counter, in response to detection that the range has been reached.

5. An electronic circuit according to claim 1, wherein the adjustable current supply circuit comprises a plurality of driving elements of predetermined strength coupled in parallel to the digital communication conductor, the control circuit being arranged to control which of the driving elements will be active, said information being indicative of a count of number of driving elements that were active when the detector circuit indicated that the digital level had been detected.

6. An electronic circuit according to claim 5, wherein the control circuit is arranged to activate an additional number of driving elements in response to detection that the range is reached, so that in total a predetermined number of driving elements is activated, and to deactivate said additional number of driving elements substantially simultaneously as said first step.

7. An method of controlling transitions of a potential on a digital communication conductor to and from a digital level, the method comprising:

progressively increasing a drive strength when the potential of the communication is changed to the digital level;

detecting whether the potential has reached a predetermined range;

storing information about a drive strength that was used when the predetermined range was reached;

restoring the drive strength to the drive strength represented by the stored information at a start of a change away from the digital level.

8. A method accord to claim 7, wherein the drive strength is stepped up to a predetermined level in response to detection that the potential has reached the predetermined range.

* * * * *